April 28, 1970  D. J. SCHMITT  3,509,417
HEADLIGHT OUTAGE SWITCH
Filed March 2, 1967
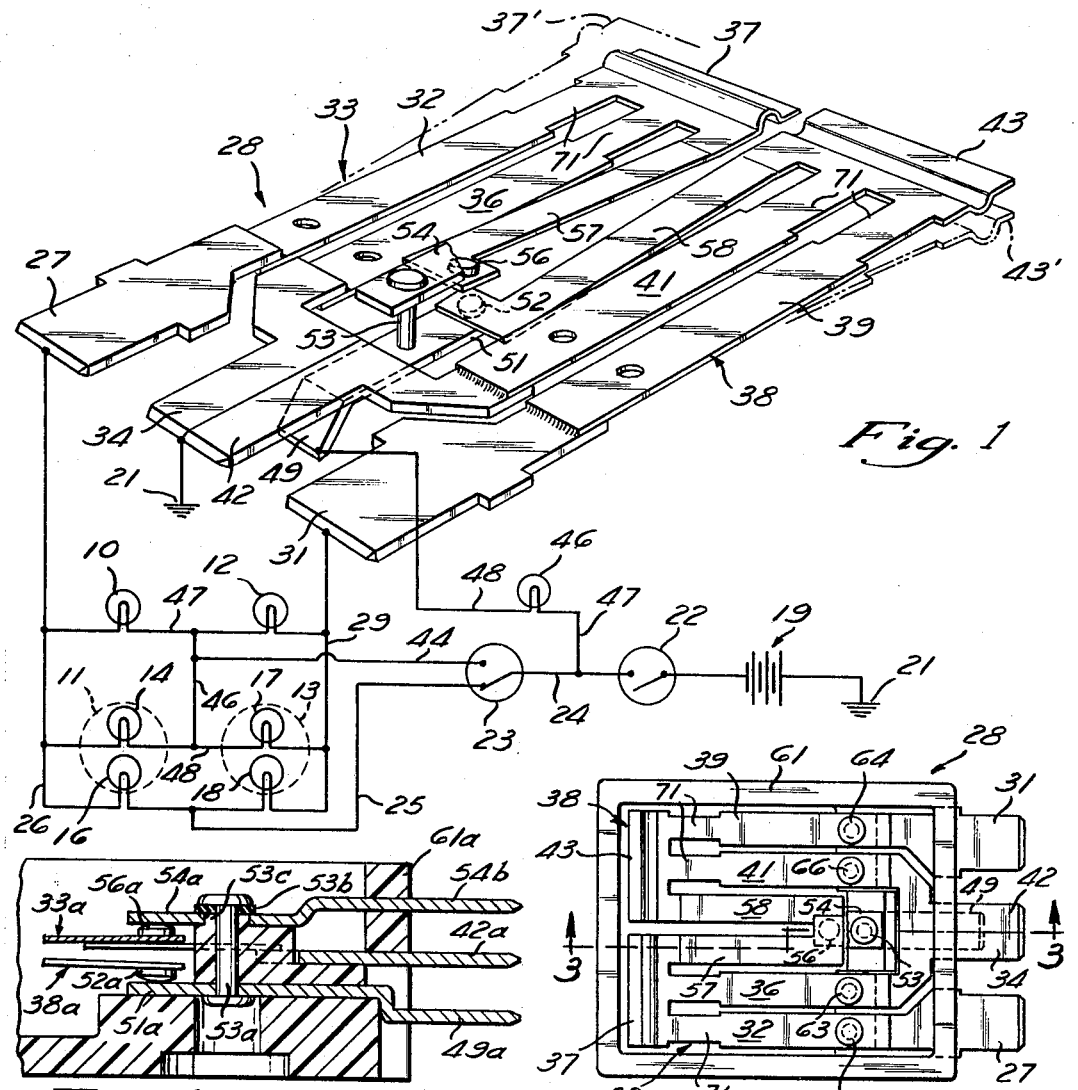
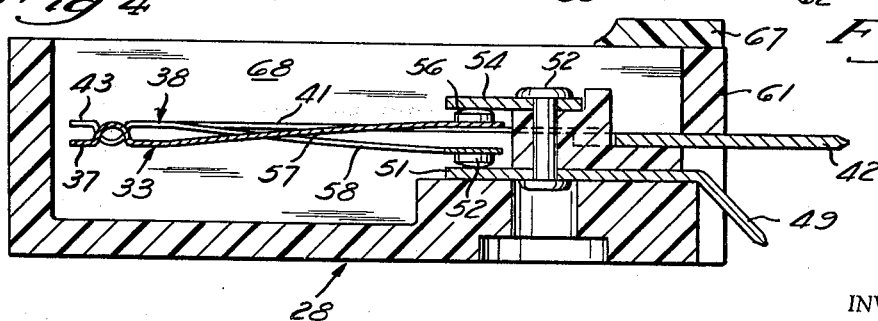
INVENTOR.
DONALD J. SCHMITT
BY
McNENNY, FARRINGTON, PEARNE, & GORDON
ATTORNEYS

United States Patent Office 3,509,417
Patented Apr. 28, 1970

3,509,417
HEADLIGHT OUTAGE SWITCH
Donald J. Schmitt, Mansfield, Ohio, assignor, by mesne assignments, to Therm-O-Disc, Incorporated, a corporation of Ohio, incorporated in 1968
Filed Mar. 2, 1967, Ser. No. 620,099
Int. Cl. B60g 1/02
U.S. Cl. 315—82
23 Claims

ABSTRACT OF THE DISCLOSURE

A vehicle headlight outage system and switch which operates to energize an indicator light when one of the vehicle headlights is not functioning. The switch also operates the indicator light for a short period of time when the vehicle lights are first turned on, so that a positive indication is provided that the indicator system is functioning properly. The switch includes two similar, ambient temperature compensated, bimetallic elements with one element connected in the circuit of one bank of headlights on one side of the vehicle and the other element connected in the circuit of the other bank of headlights on the other side of the vehicle. The two elements are mounted to operate in opposite directions and to sense an imbalance in the current flow through the two banks of headlights. The indicator light is connected to the switching device and is energized whenever the current imbalance exceeds a predetermined value.

Field of invention

This invention relates generally to sensing systems and more particularly to a novel and improved condition sensing device employing bimetallic elements adapted to indicate a malfunction of a vehicle headlight, or the like, and to a system including such a device.

Prior art

It has been proposed in the past to use a special ammeter type sensing device to indicate a malfunction of a vehicle headlight. This proposed ammeter type device was provided with two oppositely acting coils arranged to provide a centered needle reading when all vehicle lights were functioning properly and to provide an off-center needle position when one of the lights malfunctioned. Such devices have not attained any general commercial use, at least in part, because they are relatively expensive to manufacture and install.

Summary of invention

The present invention provides a low cost, reliable system to provide a visual signal when a vehicle light, such as a headlight or a taillight, malfunctions. The system includes a condition sensing switching device employing a pair of oppositely acting, bimetallic elements which operate to energize an indicator light when a connected vehicle light malfunctions. The illustrated condition sensing device is arranged so that the indicator light is momentarily energized when the vehicle lights are first turned on, so that a positive indication is provided that the system is functioning properly.

The illustrated condition sensing switching device utilizes two identical, bimetallic elements mounted on a base about the size of a matchbox. Consequently, the device can be easily mounted in any convenient location on the vehicle. The two bimetallic sensing elements are insensitive to ambient temperature, so that the device can be located in substantially any vehicle temperature zone and will function properly under all environmental temperature conditions.

The structure of the condition sensing switching device is simple and employs a relatively small number of parts. Therefore, the cost of the parts and the cost of the assembly is minimized. Reliability is also provided, since linkages and pivots are not required, and since the switching elements are enclosed and protected by a body which resists entry of dirt and other contaminants.

It is an important object of this invention to provide a novel and improved condition sensing device employing bimetallic sensing elements to sense an imbalance in the operating condition of at least two connected loads.

It is another important object of this invention to provide a novel and improved condition sensing device, according to the preceding object, which is particularly adapted to indicate a malfunction of a vehicle light, or the like.

It is another important object of this invention to provide a novel and improved condition sensing device, according to either of the preceding objects, which provides a positive test signal or indication to establish that this system is operating properly.

It is still another important object of this invention to provide a novel and improved condition sensing device employing similar but opposed bimetallic sensing elements, each of which is adapted to be connected to an associated load, wherein the elements are insensitive to ambient temperature and sensitive only to load operating conditions.

It is still another important object of this invention to provide a novel and improved condition sensing switching device operable to energize an indicating system when the operating conditions of associated loads deviates from a predetermined relationship.

It is still another important object of this invention to provide a novel and improved indicating system for vehicles which operates to indicate a malfunction in one of the vehicle lights.

Further objects and advantages will appear from the following description and drawings, wherein:

FIGURE 1 is a schematic illustration of a sensing system incorporating this invention illustrating the operating elements of the condition sensing device in perspective view;

FIGURE 2 is a plan view of one preferred condition sensing device incorporating this invention with the top removed;

FIGURE 3 is an enlarged, side elevation, in longitudinal section taken generally along 3—3 of FIGURE 2; and FIGURE 4 is a fragmentary section of a modified form of condition sensing switch incorporating this invention.

In FIGURE 1 the present invention is schematically illustrated in a typical headlight system for a vehicle. Four headlights 10, 11, 12 and 13 are illustrated. The headlights 10 and 11 are in the bank of headlights on one side of the vehicle and the headlights 12 and 13 are in the bank of headlights on the other side of the vehicle. The two headlights 10 and 12 are single element, high beam lights, and each of the headlights 11 and 13 is a dual element light. The elements 14 and 17 of the dual element lights 11 and 13, respectively, operate with the headlights 10 and 12 when high beams are required. The other elements 16 and 18 of the dual element lights 11 and 13, respectively, are the low beam elements normally used for passing and city driving.

The electrical system for powering the lights is schematicaly illustrated as including a storage battery 19 with one side connected to ground 21 and the other side connected to a headlight switch 22 used to turn the headlights on and off. The switch 22 is connected to a two position dimming switch 23 by a conductor line 24. In the position illustrated the dimmer switch 23 energizes the low beam elements 16 and 18 through a conductor line 25 connected to one side of both of the light elements 16 and 18. The other side of the light element 16 is connected through a conductor line 26 to one terminal 27 of a condition sensing switching device 28. The other side of the light element 18 is connected through a conductor line 29 to another terminal 31 of the sensing device 28.

The terminal 27 is welded, brazed, or otherwise suitably mounted on one leg 32 of a first bimetallic sensing element 33. A grounding terminal 34 is similarly mounted on a second leg 36 of the sensing element 33. The two legs 32 and 36 of the sensing element 33 are connected at their ends remote from the terminals 27 and 34 by a cross portion 37 which cooperates with the two legs to form a U-shaped portion of the sensing element 33. The ground terminal 34 is connected to the ground 21, so a complete circuit is provided for the operation of the low beam light element 16 with the U-shaped portion of the sensing element 33 connected in series with the light element.

A second sensing element 38 is identical in structure to the sensing element 33 and is provided with a first leg 39 mounted on the terminal 31 and a second leg 41 mounted on a ground terminal 42. Here again, the legs 39 and 41 cooperate with an integrally formed cross portion 43 to form a U-shaped portion as part of the sensing element 38, so the light element 18 is in series with the U-shaped portion of the sensing element 38.

When the dimmer switch 23 is operated to the other position for high beam operation it energizes the two lights 10 and 12 and the high beam elements 14 and 17 through a conductor line 44. The conductor line 44 is connected by branch lines 46, 47 and 48 to one side of each of the high beam lights 10, 12, 14 and 17. The other side of each of the high beam light elements 10 and 14 is connected to the conductor line 26 so that these light elements are connected in parallel with each other and are both connected in series with the sensing element 33. Similarly, the other side of each of the high beam light elements 12 and 17 is connected to the conductor line 29 so that these light elements 12 and 17 are connected in parallel with each other and are both connected in series with the sensing element 38. The two ground terminals 34 and 42 are abutting along one edge and cooperate to form a single, compound ground terminal connected to the ground 21.

When all portions of the system are functioning properly, closing of the headlight switch 22 while the dimmer switch 23 is in the illustrated position causes the low beam light element 16 and 18 to light simultaneously. Operation of the dimmer switch 23 to the high beam position causes the high beam light elements 10, 12, 14 and 17 to operate.

An indicator light 46 is connected on one side through an electrical conductor 47 to the conductor line 24 and on its other side by a conductor line 48 to a terminal 49 on the sensing device 28. The terminal 49 is formed of a strip of metal which has a contact portion 51 extending under a contact 52 and is connected by a rivet 53 with a second contact portion 54 extending over a second electrical contact 56. The contact 56 is mounted on the upper side of a free arm portion 57 integrally formed on the sensing element 33 and extending from the cross portion 37 substantialy parallel to the two legs 32 and 36. Similarly, the contact 52 is mounted on the end of a free arm 58 integrally formed with the sensing element 38 and extending from the cross portion 43 in a direction substantially parallel to the two legs 39 and 41 of the sensor 38. Whenever either of the contacts 52 or 56 are in engagement with either of the contact portions 51 and 54, while the headlight switch 22 is closed, a complete circuit is provided through the legs 36 or 41 and the indicator light 46 is energized. However, when both of the contacts 52 and 56 are spaced from their associated contact portions 51 and 54 the indicator light 46 is deenergized even though the headlight switch 22 is in the closed position. Of course, the indicator light cannot light when the headlight switch 22 is open.

Referring now to FIGURES 2 and 3. The condition sensing device 28 includes a body 61 preferably molded of dielectric insulating material. The body 61 is not illustrated in FIGURE 1. The sensing element 33 is mounted in the body 61 by two rivets 62 and 63 which extend through the legs 32 and 36, respectively. Similarly, rivets 64 and 66 extend through the legs 39 and 41, respectively, of the sensing element 38 to secure it in the body 61. The terminals 27, 31, 34, 42 and 49 all project beyond one end of the body 61 so that they may be connected through suitable connectors to the light system. A cover 67 is cemented or otherwise suitably secured to the body 61 and cooperates with the body 61 to form a closed switching cavity 68 in which the sensing devices are mounted. A suitable sealing material is preferably applied around the terminals and over the ends of the rivets so that the device is sealed against entry of dirt or other contaminants.

Under a standard ambient temperature the two legs 39 and 41 of the sensing element 38 are straight and lie along a plane parallel to the plane of the two legs 32 and 36 of the sensing element 33. In the illustrated sensing device the terminals 27, 31, 34 and 42 are coplanar and the legs 32 and 36 of the sensing element 33, as viewed in FIGURE 1, are mounted on the under side of the associated terminals 27 and 34 while the legs 39 and 41 of the sensing element 38 are mounted on the upper side of the associated terminals 31 and 42. With this arrangement the sensing elements and their associated terminals are identical in structure and the planes of the legs mentioned above are spaced by a distance substantially equal to the thickness of the terminals. Under the same ambient temperature the free arm 57 extends upwardly above the plane of the legs 32 and 36 (as best illustrated in FIGURES 1 and 3) to hold the contact 56 in engagement with the contact portion 54. Similarly, under the same ambient temperature the free arm 58 extends below the plane of the legs 39 and 41 and maintains its contact 52 in engagement with the contact portion 51. The higher expansive side of the sensing element 33 is the lower side, as illustrated in FIGURE 1, and the higher expansive side of the sensing element 38 is the upper side. Consequently, increases in temperature tend to raise the cross portion 37 toward the phantom position 37' and also lower the cross portion 43 toward the phantom position 43'.

The two sensing elements 33 and 38 are insensitive to changes in ambient temperature. As the two legs 39 and 41 increase in temperature, due to an increase in ambient temperature, the cross portion 43 tends to move downwardly toward the phantom position 43' due to the increase in temperature of the two legs 39 and 41. At the same time the free arm 58 tends to bend in the same direction due to its similar increase in temperature so that it maintains its contact 52 in engagement with the contact portion 51. Similarly, increases in ambient temperature cause the legs 32 and 36 along with the free arm 57 to increase in temperature in an equal manner, so the cross portion 37 tends to move in an upward direction toward the phantom position 37' with the free arm 57 maintaining the contact 56 in engagement with its contact portion 54. Consequently, the amount of deflection of the free arm portions 57 and 58 from their unstressed condition caused by the contact portions 51 and 54 remain substantially constant when ambient temperatures change.

When the headlights are turned on a different action occurs. The current flowing through the right bank of headlights 12 and 13 flows through the U-shaped portion formed by the legs 39 and 41 and the cross portion 43 and causes the legs 39 and 41 to be heated due to the electrical resistance thereof. This heating of the legs occurs without a corresponding heating of the associated free arm portion 58 and causes the cross portion 43 to move to the phantom position 43'. When this occurs the free arm portion 58, because it is not heated a corresponding amount, lifts the contact 52 out of engagement with the contact portion 51 in a direction toward the contact 56. A similar action occurs in the sensing element 33 as a result of the current flow through the left bank of headlights 10 and 11. In this instance, however, the heating of the legs 32 and 36 due to the current flow causes the cross portion 37 to raise to the phantom portion 37'. Here again, the free arm portion 57 is not heated in a corresponding manner, so the contact 56 is moved downwardly away from the contact portion 54 toward the contact 52.

When the temperature increase in the legs 32 and 36 is substantially equal to the temperature increase in the legs 39 and 41 the two free ends of the arms 57 and 58 move to mutual engagement. At such time both of the contacts 52 and 56 are out of engagement with their associated contact portions 51 and 54 and the contacts are located approximately midway between the two contact portions 51 and 54. Further balanced increases in temperature of the legs of the two elements merely causes the free arms to press tighter together, but does not cause the contacts 52 and 56 to touch either of the associated contact portions 51 and 54. This is the condition that occurs when all of the headlights are functioning properly. In that event, excepting for the momentary lighting of the indicator light 46 occurring when the headlight switch 22 is first turned on, the indicator light remains de-energized.

In the event, however, that one of the headlight elements burns out or fails to function properly, due to a break in one of the connecting lines, the current flow in the conducting line 26 does not equal the current flow in the conducting line 29. In such an event the temperature above ambient temperature reached by the legs of one sensing element is higher than the temperature above ambient temperature reached by the legs of the other element. For example, under high beam operation, if the headlight 10 malfunctions and fails to light the current flow through the legs 39 and 41 of the sensor 38 is greater than the current flow through the legs 32 and 36 of the sensor 33, so the legs of the sensor 38 reach a higher temperature than the legs of the sensor 33. In that event the deflection or movement of the cross portion 43 from its central position is greater than the deflection or movement of the cross portion 37 and the free arm 58 is stressed to a greater extent than the free arm 57. Consequently, the free arm 58 through its engagement with the free arm 57 pushes the contact 56 into engagement with the contact portion 54 and causes the indicator light 46 to be energized.

A similar but opposite action occurs in the event that one of the light elements in tht right bank of lights fails to function properly. For example, if the light element 17 fails to light the current flow through the legs of the sensing element 33 is greater than the current flow through the legs of the sensing element 38. Consequently, the cross portion 37 is displaced from its neutral or normal position further than the cross portions 43. In this event the stress in the free arm 57 is greater than the stress in the free arm 58 and the two arms tend to move toward a point of equal stress causing the contacts 52 to engage the contact portion 51 to again light the indicator light 46.

The sensing device 28 therefore functions to energize the indicator light 46 momentarily when the headlights are first turned on and to extinguish the indicator light 46 only when the currents flowing through the two sensing elements are substantially balanced.

The spacing of the two contact portions 51 and 54 is arranged so that a limited unbalance in current flow can occur to accommodate differences in manufacturing tolerances of the headlights without lighting the indicator light 46. However, when the imbalance is of the order created by the malfunction of one of the headlights the indicator light 46 is energized. It should be noted that when the low beams are operated the current through the two sensing elements 33 and 38 is substantially balanced even though the current flow is at a lower rate, since only one bulb or light is connected in series with each sensing element. The current flow, however, is enough to produce sufficient displacement of the cross portions to cause the free ends of the arms 57 and 58 to move to a centered position to extinguish the indicator light and to cause the indicator light to be energized in the event that one or the other of the low beam light elements 16 or 18 malfunctions.

The condition sensing device 28 does not provide a measure of the absolute value of current flow but rather provides a measure of balance or imbalance of two currents. In the illustrated system the loads are similar, so the two sensing elements are formed of the same bimetallic material and are identical in shape. If, however, the device is to be used to compare current flows in connected loads of different but related sizes, the two sensing elements may be formed of bimetallic material having different resistances or may be formed with different shapes. When a proper selection of the shape and material is made the sensing elements operate in a manner related to the size of the loads and such a device will indicate when the connected loads deviate from a predetermined operating relationship.

It should be understood that even though the condition sensing device 28 is illustrated as used in a headlight system of a vehicle, a condition sensing device incorporating this invention can also be used to indicate a malfunction of a tail-light. In any given installation the sensing elements are selected and sized to provide proper operation under the current flows encountered. For example, if greater sensitivity is required a bimetallic material is selected having a higher resistance, so that the necessary temperature differentials can be achieved to produce proper operation of the device at lower current flow conditions. Also, the legs are preferably formed with sections of reduced lateral width 71 adjacent to the cross portions 37 and 43 to increase the resistance of the legs at these sections and concentrate the heating or temperature rise to those portions of the legs remote from the terminals. Deformation of the sensing elements caused by heating in the sections 71 is more effective in causing movement of the free ends of the arms 57 and 58 than corresponding deflections adjacent to the terminals. Therefore, the reduced cross-section portions at 71 increase the sensitivity of a particular device. The crossed portions 37 and 43 are also preferably formed with stiffening ribs to increase stability and to insure consistent operation of the device. It is also pointed out that a condition sensing device incorporating this invention can be used to compare the operation of other types of loads other than lighting loads for vehicles. In a vehicle installation of the type illustrated the condition sensing device 28 is preferably mounted near the light load so that the length of the connecting wiring is minimized. A relatively small size conductor can connect to the indicator light 46 since the current requirement of such light is small. Generally the indicator light 46 is remote from the sensing device 28 and is mounted on the instrument panel of the vehicle.

FIGURE 4 discloses a modified form of condition sensing device which may be connected to two separate indicator lights, so that the device indicates not only the malfunction of one light in the connected load but also indicates the bank or load in which the malfunction occurs. In this embodiment all of the elements other than the indicator terminal connection and the contact portions 51 and 54 are identical with the embodiment of FIGURES 1 through 3. Therefore, similar reference numerals are used to indicate similar parts with a letter added to indicate reference to the second embodiment. In this embodiment the upper contact portion 54a is provided with an external terminal 54b and is insulated from the rivet 53a by an insulating washer 53b and a tubular extension 53c formed on the body 61a. Consequently, the terminal 54b is insualted from the terminal 49a. With this embodiment the terminal 49a is connected to one indicator light or other indicating means and the terminal 54b is connected to another indicator light or indicating means. When the associated loads, connected in the same manner as in the first embodiment, are operating with the proper balance the contacts 52a and 56a are spaced from the associated contact portions 51a and 54a. When the load connected in series with the sensing device 33a malfunctions, the contact 56a is moved into engagement with the contact portion 54a and the indicator connected to the terminal 54b is energized. This provides an indication that a malfunction is occurring and also an indication of which associated load is functioning improperly. On the other hand, if the other associated load connected in series with the sensing device 38a malfunctions, the contact 52a is caused to move into engagement with the contact portion 51a to energize the indicator connected to the terminal 49a. Here again, the indicator provides an indication both of a malfunction and an indication of the particular load which is malfunctioning.

With both embodiments of this invention a simple, reliable, low cost, condition sensing device is provided to provide a signal to indicate a malfunction in the operation of a connected load. Also, a test signal is momentarily supplied when the loads are first energized to establish that the indicator system is functioning properly.

Although preferred embodiments of this invention are illustrated it is to be understood that various modifications and rearrangements of parts may be resorted to without departing from the scope of the invention disclosed.

What is claimed is:

1. A condition sensing device comprising a body, a first and second bimetallic elements mounted on said body, each element being adapted to be operatively connected to a separate associate load so that the temperature of each element is a direct function of the operating condition of such associated load, said elements each producing a force tending to cause movement thereof which is a direct function of their temperature, said elements being interconnected so that said forces are oppositely acting and are balanced when a predetermined temperature relationship between said elements exists and said forces are unbalanced when said predetermined temperature relationship does not exist, switch means on said body operatively connected to said elements movable between an open position and a closed position, said elements maintaining said switch means in one position when said elements are heated by their associated loads to temperatures which have a predetermined relationship, said elements causing said switch means to move to the other of said positions when said elements are heated to temperatures which do not have said predetermined relationship.

2. A condition sensing device as set forth in claim 1 wherein said elements are ambient temperature compensated and are substantially insensitive to changes in ambient temperature.

3. A condition sensing device as set forth in claim 1, wherein said elements move said switch means to said closed position when said elements are heated by their associated loads to temperatures which do not have said predetermined relationship, and said elements also move said switch means to said closed position when both associated loads are not operating.

4. A condition sensing device as set forth in claim 1 wherein said loads are electrically operated and each element is adapted to be connected electrically in series with the associated load so that heating of each element occurs as a direct function of the current through the associated load.

5. A condition sensing device comprising a body, first and second electrically isolated bimetallic elements mounted in said body, each element being adapted to be separately connected to a separate associated load, each element including a free arm portion overlapping the free arm portion of the other element, each element being separately heated as a direct function of the operating condition of its associated load, electrical contact means on said body adjacent the overlapping parts of said free arms, said contact means being adapted to be connected to signal means and cooperating with said free arm portions to energize such signal means when engaged by either of said free arm portions, each element being arranged to move its free arm portion toward the other free arm portion and away from said contact means when the associated loads are operating with a predetermined relationship of operating conditions, said elements causing engagement of at least one free arm portion and said contact means when said associated loads are not operating with said predetermined relationship.

6. A condition sensing device as set forth in claim 5 wherein at least one of said free arm portions is in contact with said contact means when the associated loads are not operating.

7. A condition sensing device as set forth in claim 5 wherein said elements are similar in shape and are mounted in said body to operate in opposite directions in response to heating of the elements.

8. A condition sensing device as set forth in claim 7 wherein each element includes a U-shaped portion providing legs joined at one end and mounted on said body at their other end, and said free arm portion of each element is connected to said U-shaped portion at said one end of said legs.

9. A condition sensing device as set forth in claim 8 wherein the associated loads are electrically powered, and said other ends of said legs are adapted to be connected to the associated load so that a current flows through each U-shaped portion at a rate which is the function of the operating condition of the associated load.

10. A condition sensing device as set forth in claim 9 wherein at least one of said free arm portions is in contact with said contact means when the associated loads are not operating.

11. A condition sensing device comprising a body, first and second bimetallic elements mounted in said body, each element including a free arm portion overlapping the free arm portion of the other element, each element being adapted to be heated as a direct function of the operating condition of an associated load, electrical contact means on said body adjacent the overlapping parts of said free arms, said contact means being adapted to be connected to signal means and cooperating with said free arm portions to energize such signal means when engaged by either of said free arm portions, each element being arranged to move its free arm portion toward the other free arm portion and away from said contact means when the associated loads are operating with a predetermined relationship of operating conditions, said elements being similar in shape and being mounted in said body to operate in opposite directions in response to heating of the elements, each element including a U-shaped portion providing legs joined at one end and mounted on said body at their other end, and said free arm portion of each element is connected to said U-shaped portion at said one end of said legs, the associated loads being eletrically powered, and said other ends of said legs are adapted to be connected to the associated load so that a current flows through each U-shaped portion at a rate which is the function of the operating condition of the associated load, at least one of said free arm portions is in contact with said contact means when the associated loads are not operating, said associated loads are similar headlights on each side of a vehicle, and the headlights on one side of the vehicle are connected in series with the U-shaped portion of one element and the headlights on the other side of the vehicle are connected in series with the U-shaped portion of the other of said elements.

12. A condition sensing device as set forth in claim 11 wherein said other end of one leg of each element is provided with terminal means, said terminal means being adjacent and cooperating to form a single electrical terminal.

13. A condition sensing device as set forth in claim 11 wherein said device is insensitive to changes in ambient temperature.

14. A condition sensing device as set forth in claim 6 wherein said contact means provides spaced opposed contacts, and said overlapping parts are positioned between said contacts.

15. A condition sensing device as set forth in claim 14 wherein said opposed contacts are both adapted to be connected to a single signal device.

16. A condition sensing device as set forth in claim 14 wherein each opposed contact is adapted to be connected to a separate signal device.

17. A vehicle lighting system comprising two banks of similar vehicle lights each including a plurality of lights, said lights being normally operable in selected conditions in which equal numbers of lights in each bank are simultaneously operated and including a condition when more than one light on each bank are simultaneously operating, a sensing device provided with two sensing elements, one of said elements being operatively connected with one bank of lights and the other element being operatively connected to the other bank of said lights, an indicating light connected to be operated by said sensing elements, said sensing elements operating to energize said indicating light when the lights of said banks are first turned on and thereafter de-energize said indicator light only when an equal number of lights are operating in each of said banks, said sensing elements also energizing said indicating light when the number of lights operating in one bank exceeds the number of lights operating in the other of said banks.

18. A vehicle lighting system as set forth in claim 17 wherein said elements are bimetallic and are connected to be heated as a direct function of the current flowing through the connected lights.

19. A vehicle lighting system as set forth in claim 18 wherein said elements are connected in series with the associated bank of lights.

20. A vehicle lighting system as set forth in claim 19 wherein said elements are insensitive to changes in ambient temperature.

21. A condition sensing device as set forth in claim 1 wherein each element provides a portion which is biased toward the other portion with a force which is a function of the operating condition of the associated load, said forces normally being opposite and balanced, and said elements producing a signal when the force of one portion exceeds the force of the other portion by a predetermined amount.

22. A condition sensing device as set forth in claim 5 wherein each free arm portion is urged toward the other free arm portion with a force having a value which is a function of the operating condition of an associated load, said free arm portions being spaced from said contact means when said forces are substantially balanced, and at least one of said free arm portions engaging said contact means when one of said forces is substantially greater than the other of said forces.

23. A vehicle lighting system as set forth in claim 20 wherein each element produces a force which is a function of the current flowing therethrough, said sensing device operating to energize said indicating light when the force produced by one element is greater than the force produced by the other element by a predetermined amount.

References Cited

UNITED STATES PATENTS

| 2,189,996 | 2/1940 | Riche | 200—138 X |
| 3,047,771 | 7/1962 | Clark | 315—83 |
| 3,221,210 | 11/1965 | Mullings | 315—82 |
| 3,293,489 | 12/1966 | Marshall | 315—82 X |

RAYMOND F. HOSSFELD, Primary Examiner

U.S. Cl. X.R.

315—83; 337—85, 370; 340—251